United States Patent [19]
Cretors

[11] Patent Number: 5,301,601
[45] Date of Patent: Apr. 12, 1994

[54] STORAGE AND METERING APPARATUS FOR POPCORN POPPING OIL

[75] Inventor: Charles D. Cretors, Lake Forest, Ill.

[73] Assignee: C. Cretors & Company, Chicago, Ill.

[21] Appl. No.: 984,063

[22] Filed: Nov. 30, 1992

[51] Int. Cl.⁵ .............................................. A23L 1/18
[52] U.S. Cl. ...................... 99/323.5; 99/330; 99/483; 222/105; 222/183; 222/318; 222/146.5
[58] Field of Search ................. 99/323.4–323.11, 99/483, 486, 330; 219/421, 422, 420; 222/105, 183, 146.5, 318; 141/349, 383

[56] References Cited

U.S. PATENT DOCUMENTS

| | | | |
|---|---|---|---|
| 1,545,357 | 7/1925 | Schwimmer | 99/323.8 |
| 2,123,663 | 7/1938 | Roach | 99/323.7 |
| 2,812,704 | 11/1957 | Hawks | 99/323.6 |
| 2,856,841 | 8/1953 | Cretors et al. | 99/238 |
| 2,939,379 | 6/1960 | Schmitt | 99/323.11 |
| 3,641,916 | 2/1972 | McDevitt et al. | 99/238 |
| 3,739,953 | 6/1973 | Cretors | 222/318 |
| 4,133,456 | 1/1979 | Corini | 222/146.5 |
| 4,182,229 | 1/1980 | VandeWalker | 99/323 |
| 4,421,146 | 12/1983 | Bond et al. | 141/349 |
| 4,484,697 | 11/1984 | Fry, Jr. | 222/105 |
| 4,557,399 | 12/1985 | Redick, Jr. | 222/183 |
| 4,723,688 | 2/1988 | Munoz | 222/105 |
| 4,919,308 | 4/1990 | Majkrzak | 222/146.5 |
| 5,026,969 | 6/1991 | Knepler et al. | 219/421 |
| 5,035,173 | 7/1991 | Stein et al. | 99/323 |
| 5,114,045 | 5/1992 | Herpe | 222/105 |
| 5,121,857 | 6/1992 | Hutchinson | 222/318 |

FOREIGN PATENT DOCUMENTS

| | | | |
|---|---|---|---|
| 682731 | 3/1964 | Canada | 99/323.7 |
| 0364071 | 4/1990 | European Pat. Off. | 222/105 |

*Primary Examiner*—Timothy F. Simone
*Attorney, Agent, or Firm*—Keck, Mahin & Cate

[57] ABSTRACT

A storage and dispensing means for popcorn popping oil. Popcorn popping oil is provided in a plastic bag contained within a rectangular box. The plastic bag is provided with a dispensing arrangement having a quick couple connection provided thereon. The dispensing means includes a housing having shelves for supporting the boxes in a tilted position wherein the dispensing point is lower most such that all of the popcorn popping oil may be drained from the bag within the box. The shelves are provided with electrical heaters which maintain the popcorn popping oil at a desired viscosity. A pump is provided for withdrawing the popcorn popping oil from the bags and supplying it to a popping kettle.

29 Claims, 1 Drawing Sheet

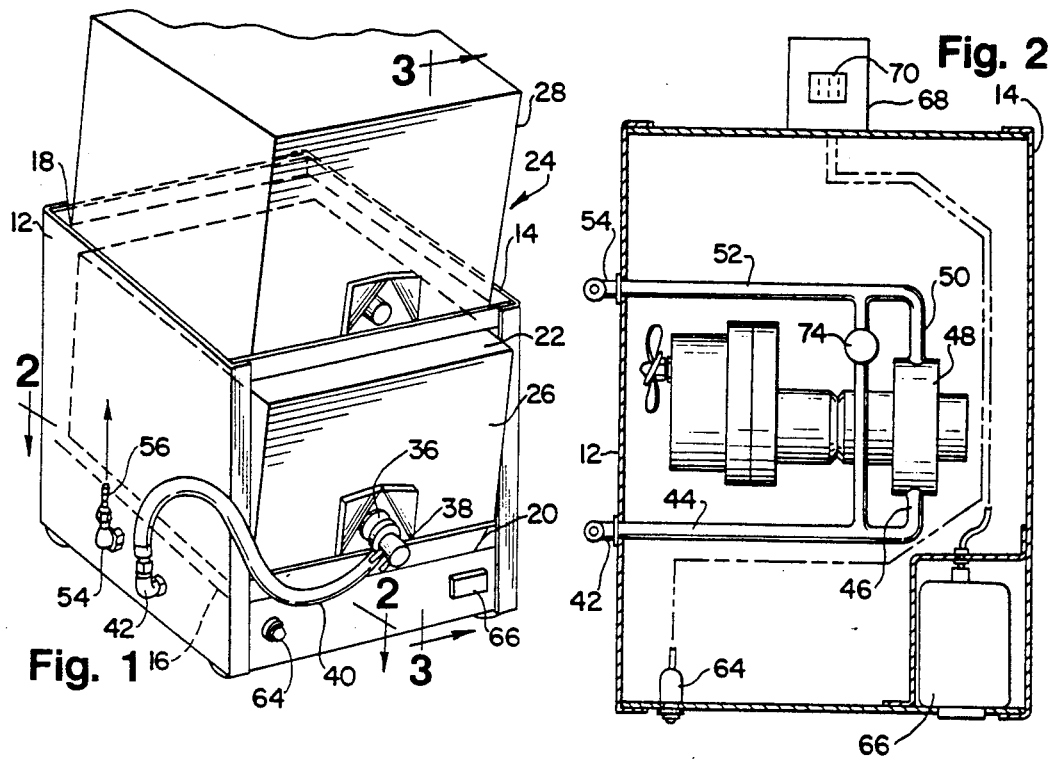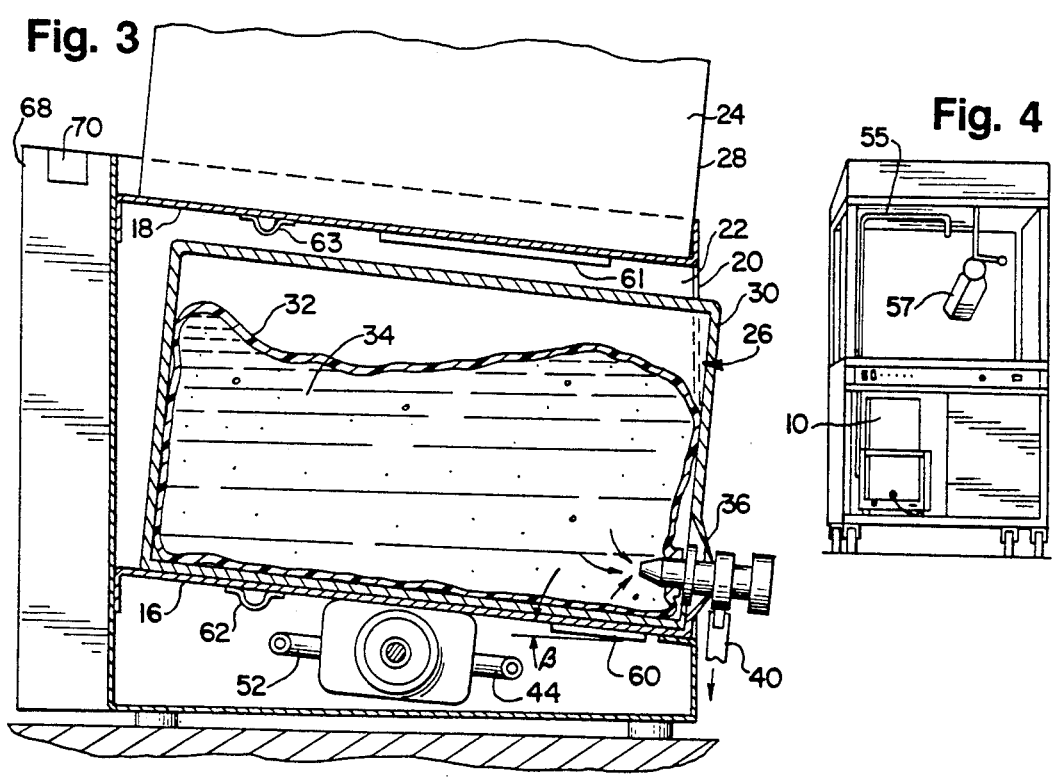

STORAGE AND METERING APPARATUS FOR POPCORN POPPING OIL

BACKGROUND OF THE INVENTION

This invention relates to the storage and dispensing of popcorn popping oil used in the production of large quantities of popped popcorn. In the production of large quantities of uniformly popped and seasoned popcorn, popcorn popping oil is a critical ingredient which must be delivered in a predetermined quantity, along with the corn to be popped, to the popping kettle at the beginning of a popping cycle.

During the production of popped popcorn, it is desirable that a continuing supply of popcorn popping oil be available without interruption such as might result from a complex arrangement for changing the source of the popping oil. In the past, popcorn popping oil has been provided in five gallon steel pails which hold approximately fifty pounds of popping oil.

In the mass production of large quantities of popcorn, a series of independent poppers may be operated simultaneously with the popcorn popping oil being delivered to each of a plurality of poppers as they begin their respective cycles. In such a popping operation a large quantity of popping oil must be readily available.

In the past, to dispense popcorn popping oil from a steel pail, an operator removes the top from the pail and inserts a pump in the popping oil. The pump is connected to the popcorn making machine with a power cord and a popcorn popping oil discharge tube. The pump, which is submerged in the popcorn popping oil, and rests on the bottom of the pail and is driven by a drive shaft from a motor which is located above the pail. A timer associated with the popcorn machine controls the pump run time and therefore provides a measured volume of popping oil to the popping kettle. A heating element is provided in association with the pump to melt any solidified popping oil and to maintain the popping oil at a viscosity desireable for pumping.

There are some less than desirable features of this system of popcorn popping oil delivery. First, the fifty pound pails are awkward to handle, particularly when a person finds them too heavy to lift with one hand. Second, the steel pails are difficult to dispose of. Sanitation requirements and shipping expenses make it impractical to re-use them. The volume of the pail and small amount of steel in a pail makes it impractical to recycle the pails as scrap steel. Third, the insertion and removal of the pump from the pail of popcorn popping oil is somewhat inconvenient. The pump having been submerged in popping oil, the oil may drip from it as it is moved from an empty to a full pail.

SUMMARY OF THE INVENTION

It is an object of this invention to provide a popcorn popping oil storage and delivery system wherein the popping oil is provided in smaller, lighter and more easily handled packages, which packages are more easily disposed of or recycled. It is a further object of the invention to provide a storage and dispensing system such that when one container is exhausted, the dispensing may be continued from a second container with a minimal disruption in supply and in an easily performed manner. Still another object of the invention is to provide an arrangement for dispensing popcorn popping oil wherein a pump does not have to be submerged in the container of popping oil to be dispensed. Another object of the invention is to provide a popcorn popping oil storage and dispensing system which more completely removes all of the popping oil from the supply container in the course of its normal operation.

In accordance with this invention, popcorn popping oil is supplied in a container formed of a plastic bag contained within a box which may be made of cardboard or other similar materials. The plastic bag is provided with a dispensing outlet which in a preferred form is one portion of a quick connect/disconnect service line connector. A housing which is provided for supporting the container of popcorn popping oil includes a heater for raising the temperature of the popping oil so as to melt any solidified popping oil and to lower the viscosity of the popping oil such that it may be more easily pumped. A pump is provided for delivering the popping oil from the container to a popping kettle in a popping machine.

In a preferred embodiment of this invention, the housing is formed as a rectangular stainless steel structure having a generally open front. The housing includes at least one shelf which slopes downwardly toward the front of the housing. Such that upon the exhaustion of one supply container another may be readily substituted, the housing is provided with either a single sloping shelf large enough to support two containers or two shelves each capable of supporting a single container. A heating element is associated with each of the shelves such that heat may be transferred through the storage containers to the popcorn popping oil, thereby raising the temperature of the popping oil until it reaches a desired viscosity for pumping. In a preferred embodiment of this invention, electrical heating elements are secured to the bottom of the shelves such that heat is transmitted through the shelf and the bottom portion of the container to the popcorn popping oil contained therein. A pump is provided in the housing for transferring the popping oil from a storage container to a popping kettle. In a preferred embodiment, the pump is located at the bottom of the housing under the lowest shelf. The pump input is connected by a flexible tubing to a first portion of a connector which mates with a second portion of a connector which is provided on the container. The pump output is connected by a conduit to discharge popcorn popping oil into the popping kettle.

BRIEF DESCRIPTION OF THE DRAWINGS

FIG. 1 shows a perspective view of a popcorn popping oil storage and dispensing system constructed in accordance with a preferred embodiment of this invention.

FIG. 2 is a cross-sectional view of the popcorn popping oil storage and dispensing system taken along the line 2—2 in FIG. 1.

FIG. 3 is a cross-sectional view of popcorn popping oil storage and dispensing system taken along the line 3—3 in FIG. 1.

FIG. 4 is a perspective view of a popcorn popper including the popcorn popping oil storage and dispensing system shown in FIGS. 1-3.

DESCRIPTION OF THE PREFERRED EMBODIMENT

Referring to the drawings, and particularly to FIGS. 1-3, a preferred embodiment of the popcorn popping oil storage and dispensing system of this invention includes a rectangular housing 10, which is formed of stainless steel such that it may be readily cleaned in accordance with customary food handling sanitation requirements. The stainless steel housing is provided with a pair of sidewalls 12 and 14 between and upon which are supported a pair of shelves 16 and 18. As may be observed in FIGS. 1 and 2, both of the shelves 16 and 18 slope downwardly toward the front of the housing. The top shelf 18 also forms the top of the housing. The front 20 of the housing is provided with an opening 22 through which the bottom shelf 16 may be accessed.

Containers of popcorn popping oil 24 and 26 are shown placed on the upper and lower shelves 14 and 16 respectively. The containers 24 and 26 are shown as rectangular boxes 28 and 30 respectively. A flexible bag is placed in each of the boxes to receive and contain popping oil. In FIG. 3, a flexible bag 32, partially filled with popping oil 34, is shown in box 30. The boxes 28 and 30 are typically formed of cardboard or a similar material, which is strong enough to retain the bags filled with popcorn popping oil, but which is also lightweight and preferably recyclable.

As supported by the housing 10, the containers 24 and 26 are each provided with a dispensing connector at the front center lower edge. The dispensing connector is provided with a first portion of a quick connect/disconnect service-line connection 36 which is readily connected to a mating portion 38. As shown in FIG. 1, mating connector portion 38 is secured to the end of a flexible tube 40 through which the popcorn popping oil 34 is drawn from the container.

In the preferred embodiment of this invention, the quick connect/disconnect service-line connector portions 36 and 38 are such that when they are connected to each other, a flow path is opened through connector portion 36 provided on the storage container such that the popcorn popping oil may flow through the connection to the tube 40. A quick-disconnect service-line connector and valve assembly which may be used is shown in U.S. Pat. No. 4,421,146 issued on Dec. 20, 1983 to S. Bond et al.

Referring to FIGS. 1 and 2, the tube 40 is connected to an elbow 42 which is in turn connected by a pipe 44 to the inlet port 46 of a pump 48. The pump 48 is provided with an outlet port 50 which is connected by a pipe 52 to an elbow 54. A tube 55 is attached to a connector 56 to provide the popcorn popping oil to a popping kettle 57 located in the top portion of the popper housing as shown in FIG. 4. The flow of popping oil to the popping kettle may be controlled by a metering arrangement which controls energization of a motor 58 which drives the pump 48. Or, the popping oil may be continuously pumped to a static head and controlled by a metering arrangement such as is shown in U.S. Pat. No. 3,739,953 issued Jun. 19, 1973 to Cretors. The pump 48 and motor 58 are supported as an assembly from the bottom surface of lower shelf 16.

Secured to the bottom surface of the bottom shelf 16 is a flat electrical heating element 60. The energization of heating element 60 is controlled by a thermostat 62 which senses the temperature of the lower shelf 16 which is an indication of the temperature of the popcorn popping oil in container 26. The popping oil is heated to and maintained at a temperature which results in the popping oil having a viscosity desirable for pumping and dispensing the popping oil. Similarly, a heating element 61 is secured to the bottom of top shelf 18, as is a thermostat 63 which senses the temperature of the upper shelf 18 which is an indication of the temperature of the popcorn popping oil in container 24. Other electrical components mounted below the lower shelf 16 include an indicator light 64 which indicates when the heating element is energized and a control relay 66 which controls energization of the heating element and the pump. Electrical connections (not shown) between the electrical components located below the lower shelf 16 and the controls in the popcorn popper shown in FIG. 4 extend through a duct 68 at the rear of the housing 10 to an electrical connector 70. A connector (not shown) at the end of an electrical cable extended from the popper is plugged into mating electrical connector 70.

In utilization the storage and dispensing system of this invention, a box-like container of popcorn popping oil is placed on each of the shelves, and the portion 38 of a quick connect/disconnect connector is engaged with mating portion 36 on one of the containers such that popping oil may be supplied through the pump to the poppers. The containers are typically shipped with the portion 38 of the quick connect/disconnect connector confined within the box. Provision is made in the box wall for accessing the portion 38 and pulling it out of the box. Due to the angle B at which the containers are supported, typically 5 to 15 degrees, essentially all of the popcorn popping oil may be withdrawn from the containers through the normal operation of the pump 48. When all of the popcorn popping oil in one of the containers has been removed, the portion 38 of a quick connect/disconnect connector connected to tubing 40 is uncoupled from the portion 36 on the empty container and is, in turn, coupled with portion 36 on a full container. As popcorn popping oil is being dispensed from the second container, the empty first container may be removed and replaced with a full container.

Except when there will be a long interval between the dispensing of popcorn popping oil to the poppers, the heating elements under each of the two shelves 16 and 18 are maintained energized through thermostats such that the popping oil is maintained at the proper viscosity for dispensing.

However, even when the heating elements are maintained energized, the popcorn popping oil may solidify in the pipe 52, elbow 54, connector 56 and the tube (not shown) through which the popcorn popping oil is supplied to the popping kettle. This is particularly true when coconut oil, the preferred popcorn popping oil is used. Coconut oil becomes solid at 76° F. To avoid problems with the popping oil solidifying in the tube (not shown) connected to connector 56 through which the popping oil is supplied to the popping kettle, a bypass path is provided around the pump, such that the popping oil can flow back into the flexible bag 32 when the pump 48 is not running. This bypass path is formed by a pipe 72, which connects pipes 44 and 52. A solenoid operated valve 74 is connected in pipe 72 to control the flow of popping oil through the pipe. The solenoid valve 74 may be a normally open valve which is electrically energized to be closed whenever the motor 58 driving the pump 48 is energized. Thus, popping oil may flow through the pipe 72 only when the pump 48 is not running.

While a preferred embodiment of the invention has been shown in the Figures and described, alternate embodiments of the invention will be apparent to those skilled in the art. For instance, depending upon the space available for storing and dispensing popcorn popping oil in a particular popping machine, the housing could be such that the pair of containers are mounted side by side rather than stacked. Further, if the volume of popping oil to dispense in a desired period of time should exceed the capacity of two containers, two pair of containers could be provided, with two on a lower shelf and two on an upper shelf.

While in accordance with the United State Patents Statutes, a preferred embodiment of invention has been shown and described, various changes may be made in the storage and dispensing arrangement of this invention without parting from the true spirit and scope of this invention.

The appended claims are intended all such changes and modifications which fall within the true spirit and scope of this invention.

I claim:

1. A storage and dispensing system for popcorn popping oil used in the popping of popcorn comprising:
   A. a housing, said housing supporting at least one shelf,
   B. at least one container designed to contain popcorn popping oil supported on said at least one shelf, said at least one container being located at a first elevation,
   C. a connector means, said connector means having first and second portions connectable with each other, said at least one container being provided with said first portion of a connector means,
   D. a kettle within which popcorn is to be popped, said kettle being located at a second elevation, said second elevation being higher than said first elevation,
   E. a dispensing means, said dispensing means provided with said second portion of said connector means, said dispensing means including pumping means for transferring popcorn popping oil through said connected first and second portions of said connector means from within said at least one container to said kettle in which popcorn is to be popped.

2. The storage and dispensing system of claim 1, wherein said at least one shelf is inclined such that said first portion of said connector means is located at substantially the lowest point of said at least one container when said container is placed on said shelf.

3. The storage and dispensing system of claim 1, wherein said housing and said at least one shelf are formed of stainless steel such that they are readily cleanable so as to meet sanitation requirements for food storage and dispensing equipment.

4. The storage and dispensing system of claim 1, wherein there are at least two shelves, each of which supports at least one container.

5. The storage and dispensing system of claim 1, wherein each shelf supports at least two containers.

6. The storage and dispensing system of claim 1, wherein flow through either of said first or said second portion of said connector means is only possible when the first and second portions are connected to each other.

7. The storage and dispensing system of claim 1, wherein said connector means is of the quick connect/disconnect type.

8. The storage and dispensing system of claim 1, wherein said at least one container comprises a box having a flexible bag therein for containing the popcorn popping oil.

9. The storage and dispensing system of claim 8, wherein said bag is provided with said first portion of said connector means, said box being provided with an openable portion through which said first portion of said connector means may be extended for connection to said second portion of said connector means.

10. The storage and dispensing system of claim 8, wherein said box is formed of a readily recyclable material such as cardboard, and said bag is formed of a flexible plastic material.

11. The storage and dispensing system of claim 1, wherein said means for transferring popcorn popping oil includes a pump which dispenses popcorn popping oil from said at least one container, through said connected first and second portions of said connector means to said kettle.

12. The storage and dispensing system of claim 11, wherein means are provided for energizing said pump to deliver a predetermined quantity of popcorn popping oil to said kettle each time said pump is energized.

13. A storage and dispensing system for popcorn popping oil used in the popping of popcorn comprising:
   A. a housing having at least a pair of sidewalls, a front, a back, a bottom, and a pair of spaced shelves, each of said shelves having an upper and a lower surface, said shelves being supported from said sidewalls so as to slope toward the front of said housing,
   B. a pair of containers, supported on said pair of spaced shelves,
   C. a connector means, said connector means having first and second portions connectable with each other, each of said containers being provided with one of said first portions of said connector means,
   D. heating means, associated with said pair of spaced shelves, such that the heat from said heating means is transferred to said containers, and the popcorn popping oil contained within,
   E. a dispensing means, said dispensing means including said second portion of said connector means, and including means for transferring popcorn popping oil through said connected first and second portions of said connector means from within one of said pair of containers to a kettle in which corn is to be popped.

14. The storage and dispensing system of claim 13, wherein said containers comprise a box having a flexible bag therein for containing the popcorn popping oil.

15. The storage and dispensing system of claim 13, wherein said bag is provided with said first portion of said connector means, said box being provided with an openable portion through which said first portion of said connector means may be extending for connection to said second portion of said connector means.

16. The storage and dispensing system of claim 13, wherein said heating means includes heaters supported on the lower surface of each of said shelves, and said containers are supported of the top surface of each of said shelves.

17. The storage and dispensing system of claim 13, wherein said shelves are inclined such that said first portions of said connector means are located at substantially the lowest point of said bags when said boxes are placed on said shelves.

18. The storage and dispensing system of claim 13, wherein a pump is provided to dispense the popcorn popping oil from said container, through said connected first and second portions of said connector means to said popping container.

19. The storage and dispensing system of claim 18, wherein a bypass path is provided around said pump, such that popcorn popping oil which has passed through said pump may flow back to said container when said pump is not pumping.

20. The storage and dispensing system of claim 13, wherein said housing is formed of stainless steel such that it is readily cleanable so as to meet sanitation requirements for food storage and dispensing equipment.

21. The storage and dispensing system of claim 13, wherein said boxes are formed of a readily recyclable material fiber material such as cardboard, and said bags are formed of a flexible plastic material.

22. The storage and dispensing system of claim 13, wherein said heating means are electrically energized heating elements.

23. The storage and dispensing system of claim 13, wherein each of said shelves supports two of said containers.

24. The storage and dispensing system of claim 13, wherein said first and second portions of said connector means only permit flow therethrough when they are connected to each other.

25. The storage and dispensing system of claim 13, wherein said connector means is of the quick connect-/disconnect type.

26. A storage and dispensing system for popcorn popping oil used in the popping of popcorn comprising:
   A. a housing, said housing supporting at least one shelf,
   B. at least one container designed to contain popcorn popping oil supported on said at least one shelf,
   C. a heating means is associated with said at least one shelf, such that heat from said heating means is transferred to said at least one container supported on said at least one shelf, and the popcorn popping oil contained within said container,
   D. a connector means, said connector means having first and second portions connectable with each other, said at least one container being provided with said first portion of a connector means,
   E. a dispensing means, said dispensing means provided with said second portion of said connector means, said dispensing means including means for transferring popcorn popping oil through said connected first and second portions of said connector means from within said at least one container to a kettle in which popcorn is to be popped.

27. The storage and dispensing system of claim 26, wherein said heating means is supported on the lower surface of said at least one shelf, and said at least one container is supported of the top surface of said at least one shelf.

28. The storage and dispensing system of claim 27, wherein said heating means is an electrically energized heating element.

29. The storage and dispensing system for popcorn popping oil used in the popping of popcorn comprising:
   A. a housing, said housing supporting at least one shelf,
   B. at least one container designed to contain popcorn popping oil supported on said at least one shelf,
   C. a connector means, said connector means having first and second portions connectable with each other, said at least one container being provided with said first portion of a connector means,
   D. a dispensing means, said dispensing means provided with said second portion of said connector means, said dispensing means including means for transferring popcorn popping oil through said connected first and second portions of said connector means from within said at least one container to a kettle in which popcorn is to be popped, said means for transferring popcorn popping oil including a pump, a bypass path provided around said pump, such that popcorn popping oil which has passed through said pump may flow back to said container when said pump is not pumping.

* * * * *